Dec. 13, 1927.
W. AULL, JR
1,652,158
VARIABLE ELECTROSTATIC CONDENSER
Filed Nov. 29, 1922
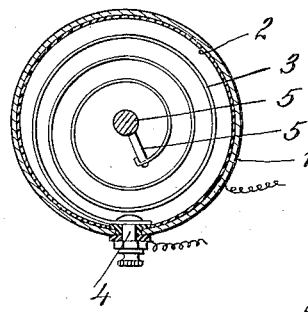
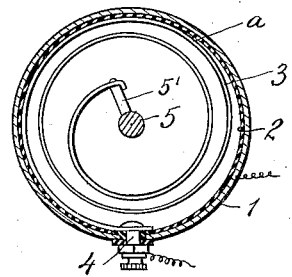
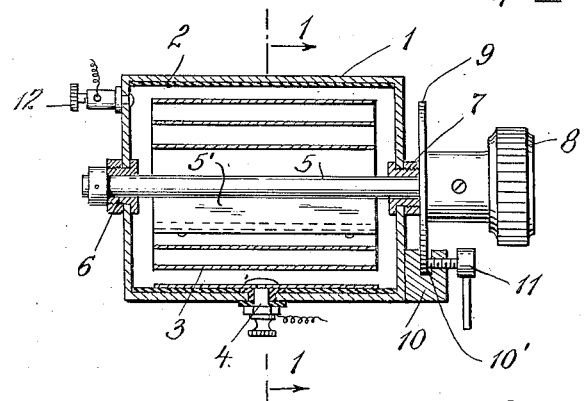
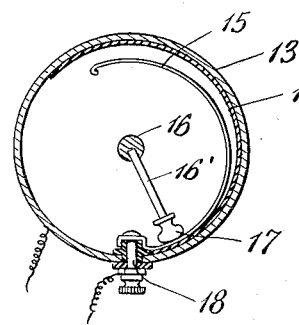
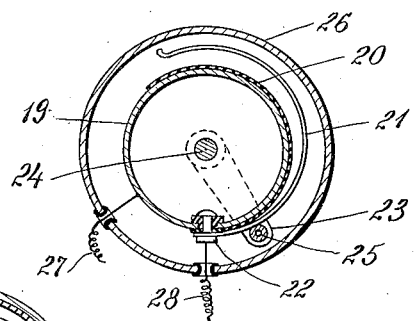
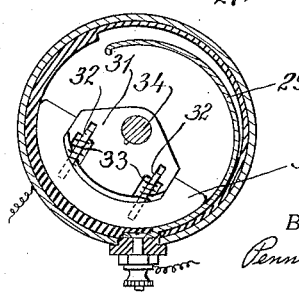
INVENTOR
Wilson Aull, Jr.
BY
Pennie, Davis, Marvin + Edmonds
ATTORNEYS Patented Dec. 13, 1927.

1,652,158

UNITED STATES PATENT OFFICE.

WILSON AULL, JR., OF NEW YORK, N. Y., ASSIGNOR, BY MESNE ASSIGNMENTS, TO DUBILIER CONDENSER CORPORATION, OF NEW YORK, N. Y.

VARIABLE ELECTROSTATIC CONDENSER.

Application filed November 29, 1922. Serial No. 603,924.

This invention relates to variable electrostatic condensers, its principal object being the provision of a variable condenser of small volume per unit capacity as compared with variable condensers which have heretofore been in common use, such as the well-known variable air condenser.

Since the capacity of a condenser for any given dielectric is inversely proportional to the distance between plates, it follows that the capacity per unit volume of variable air condensers is extremely low on account of the necessity of providing comparatively large separation between the plates.

In a copending application of William Dubilier Serial No. 576,235, filed July 20, 1922, there is described a variable condenser in which the separation between plates is extremely small, the volume of the structure per unit capacity being correspondingly reduced. In the Dubilier condenser referred to, the plates are separated by thin sheets of mica, and the movable plates are in frictional engagement with the mica. The mica dielectric has a constant ranging from 4 to 8 times that of air, a factor which, combined with the small separation obtainable, results in increasing the capacity per unit area of the plates to such an extent that the size of the structure for a given capacity is a relatively small fraction of that of an equivalent variable air condenser.

The present invention embodies the advantages of the Dubilier condenser referred to, but is an improvement thereon in that it provides a variable condenser in which friction between the adjustable plate or plates and the dielectric is substantially eliminated.

Instead of rubbing the variable plate over the surface of the mica separator, as in the Dubilier condenser, the capacity variations are made by flexing the variable plate or what may be conveniently termed "picking up" and "laying down" operations of the variable plate. These terms will be clearly defined hereinafter.

In one of the preferred embodiments of the invention, the fixed plate is in the form of an annulus, and a thin layer of mica or other suitable insulating material is secured to its inner surface. The variable plate has the form of a spiral similar to that of a clock spring, and its inner end is attached to a rotatable spindle, while its outer end is insulatively attached to the fixed plate. By turning the spindle the spiral may be expanded or contracted so that its outer surface moves toward or away from the fixed plate, thus increasing or decreasing the electrostatic capacity.

The invention may take a number of alternative forms, two of which are illustrated in the drawing and described in detail hereinafter.

Referring now to the accompanying drawing,

Fig. 1 is a cross-sectional view taken along the line 1—1 of Fig. 3 of a variable condenser constructed in accordance with this invention;

Fig. 2 is the same as Fig. 1, except that it illustrates a different operative position of the variable plate or spiral;

Fig. 3 is a longitudinal section of the condenser shown in Figs. 1 and 2;

Fig. 4 is a cross-sectional view of an alternative form of condenser in accordance with the invention;

Fig. 5 is a cross sectional view of another alternative form of condenser in accordance with the invention; and Fig. 6 is a cross-sectional view of still another alternative form of condenser constituting a modification of the form shown in Fig. 4.

The condenser structure shown in Figs. 1, 2 and 3 comprises a fixed plate having the form of a cylindrical casing 1. The inside of this casing is lined with a thin layer of mica or other suitable insulating material 2. A variable plate 3, having the form of a spiral, is insulatively secured at its outer end to the casing 1 by means of a binding post 4, to which it is electrically connected. The inner end of the variable plate 3 is connected to an arm 5', which is integral with the rotatable shaft 5. The last-mentioned shaft is journaled in the bushings 6 and 7, which are preferably of insulating material such, for instance, as hard rubber. One end of shaft 5 is provided with a knob 8 of insulating material, to which is secured a metal disc 9, the latter being kept out of contact with shaft 5. A metal block 10 is secured, in any convenient manner, to the casing 1, and is provided with a slot 10' of sufficient width to allow the disc 9 to rotate freely therein. A set screw 11 is threaded into block 10 and is so arranged that its end may be forced against the disc 9 with sufficient pressure to prevent rotation of the latter. The arrangement just described is provided for the purpose of holding the condenser in any desired setting against the tension of the variable plate 3, which, in effect, is equivalent to a clock spring. A comparative examination of Figs. 1 and 2 will show, almost at a glance, the operation of this device. In Fig. 2 the shaft 5 has been rotated 180° from the position in which it is shown in Fig. 1, and, as will be seen, the exterior surface of the variable plate 3 bears against the mica lining 2 over an arc of approximately 200°. It will be seen that the rotation of shaft 5 in a counter-clockwise direction as viewed in Figs. 1 and 2, has the effect of what is appropriately termed "laying down" the variable plate on the mica 2, as distinguished from any frictional action. This laying down operation, it will also be seen, is progressive in its nature, that is to say, it begins at or near the point where the variable plate is attached to the casing 1, and moves around in a clockwise direction. Rotation of shaft 5 in a clockwise direction, as viewed in Figs. 1 and 2, has the effect of what is appropriately termed "picking up" the fixed plate. If the shaft 5 in Fig. 2 were turned in a clockwise direction, as there viewed, the picking up action would start at about the point *a* and progress in a counter-clockwise direction toward the point at which the outer end of the fixed plate is attached. This picking up and laying down operation should be carefully distinguished from any operation in which the variable plate is moved bodily toward or away from a fixed plate. Electrical connections may be made to the variable plate 3 by means of the binding post 4, and to the fixed plate or casing 1 by means of the binding post 12.

In the alternative structure of Fig. 4, the casing 13 corresponds to casing 1 of Figs. 1, 2 and 3, and is likewise lined on its inner surface with a layer 14 of mica or other suitable insulating material which corresponds to the lining 2 in Figs. 1, 2 and 3. The curved variable plate 15 corresponds to the variable plate 3 of Figs. 1, 2 and 3, and is so shaped that when the arm 16' is rotated in a counter-clockwise direction the knob 17, which is attached thereto, will press against the lining 14, thereby progressively laying down the variable plate on the lining 14. The variable plate 15 is insulatively secured to the casing 13 by means of binding post 18, as is clearly shown.

In the alternative structure of Fig. 5, the fixed plate is in the form of an annulus 19, to the exterior surface of which is attached an arcuate layer of mica or other suitable insulating material 20. The curved variable plate 21 is insulatively secured to fixed plate 19 by means of a rivet 22 or any other convenient attaching device. An arm 23 is attached to and is rotatable with shaft 24, and to the end portion of this arm is secured a roller 25, which bears against the exterior surface of the variable curved plate 21. It will be readily seen that a rotation of shaft 24, together with arm 23, in a counter-clockwise direction, as viewed in Fig. 5, will result in forcing against or in other words "laying down" the variable plate 21 on the mica layer 20. The mechanism of this device is enclosed within a casing 26, which performs no function other than that of mechanical protection for the operating parts of the mechanism. Electrical connections may be made to this condenser through the medium of conductors 27 and 28.

In Fig. 6 is shown an alternative structure which is an improvement over that of Fig. 4. The variable plate 29 is substantially the same as plate 15 in Fig. 4, except that the arrangement for attaching to the casing is somewhat altered as a matter of convenience. Instead of the small knob 17, as in the structure of Fig. 4, there is provided a shoe 30 of insulating material, which is yieldably attached to the member 31 by means of the pins 32, which slide in apertures provided in the shoe 30. A pair of helical springs 33 function to press the shoe 30 radially against the variable plate 29. The member 31 is rigidly secured to the rotatable shaft 34. The advantage of this arrangement lies in the fact that the shoe 30 subtends a considerable arc and acts on the variable plate 29 at all points between its extremities. It will be readily appreciated that when the structure of Fig. 4 with the shaft 16 is rotated to increase the capacity, there is some possibility that the variable plate 15 will spring up at points between that at which the variable plate is fixed and the point of contact between knob 17 and the variable plate, which would result in some loss of capacity. The arrangement of Fig. 6 entirely obviates this possibility inasmuch as it presses on the variable plate over an arc which is almost equal to the entire arc of the variable plate.

Many possible modifications of this invention will be readily apparent to those skilled in the art, and it is accordingly not to be construed as limited except by the scope of the appended claims.

I claim:

1. A variable electrostatic condenser comprising a fixed plate having a curvilinear surface, a springy flexible plate electrically separated from said first-mentioned plate and having the form of a spiral, and a rotatable shaft to which said flexible plate is connected, said shaft being operable to effect a "picking up" and "laying down" operation of said flexible plate with respect to said fixed plate.

2. A variable electrostatic condenser comprising a plate having the form of an annulus, a curved springy flexible plate electrically separated from said first-mentioned plate, one end of said flexible plate being insulatively attached to said first-mentioned plate, and means for variably flexing said flexible plate toward and away from said first-mentioned plate for varying the electrostatic capacity between said plates.

3. A variable electrostatic condenser comprising a plate having the form of an annulus, a flexible plate disposed within said annulus, said flexible plate having the form of a spiral, one end of which is insulatively secured to said annulus, a rotatable shaft substantially concentric with said annulus, the inner end of said flexible plate being connected to said shaft, said shaft being operable upon rotation in one direction to effect a movement of the exterior surface of said flexible plate toward the interior surface of said first-mentioned plate and vice versa.

4. A variable condenser comprising a fixed curviform metallic conductor sheet, an insulating sheet thereon, a flexible springy metallic conductor sheet, and means comprising a rotatable knob for flexing said flexible conductor sheet to vary the capacity of the condenser.

5. In a variable electrostatic condenser, an annular plate member, an expansible and contractible capacity varying element disposed within said annular plate member, and means operable for controlling said last-mentioned element so that it may possess a larger or smaller compass for effecting capacity variations between said elements.

6. In a device of the class described, the combination of a conductor element of circular form, an adjustable conductor element of spiral form, one being contained within the other, and means for contracting or expanding the conductor element of spiral form to bring less or more of its surface adjacent to the other element.

7. In a device of the class described, the combination of a conductor element of circular form, an adjustable conductor element curved to correspond in shape with the first named element, the said adjustable element being encompassed by the first named element, and means for controlling the adjustable element so that more or less of its surface may move towards or from the first named element.

In testimony whereof I affix my signature.

WILSON AULL, Jr.